(12) United States Patent
Matsuzawa et al.

(10) Patent No.: US 10,209,152 B2
(45) Date of Patent: Feb. 19, 2019

(54) FORCE SENSOR UNIT AND ROBOT ARM INCLUDING A WIRE CABLE ROUTED FROM INSIDE A CASING TO OUTSIDE OF THE CASING

(71) Applicant: Seiko Epson Corporation, Tokyo (JP)

(72) Inventors: Akira Matsuzawa, Shiojiri (JP); Tetsuya Kawase, Azumino (JP); Yoshiteru Nishimura, Shiojiri (JP)

(73) Assignee: Seiko Epson Corporation (JP)

( * ) Notice: Subject to any disclaimer, the term of this patent is extended or adjusted under 35 U.S.C. 154(b) by 44 days.

(21) Appl. No.: 15/627,951

(22) Filed: Jun. 20, 2017

(65) Prior Publication Data

US 2017/0363490 A1    Dec. 21, 2017

(30) Foreign Application Priority Data

Jun. 21, 2016 (JP) ................................ 2016-122748

(51) Int. Cl.
| | |
|---|---|
| *B25J 13/08* | (2006.01) |
| *B25J 9/16* | (2006.01) |
| *G01L 3/04* | (2006.01) |
| *G01L 5/16* | (2006.01) |
| *G01L 5/00* | (2006.01) |

(52) U.S. Cl.
CPC ............. *G01L 5/16* (2013.01); *B25J 9/1633* (2013.01); *B25J 13/085* (2013.01); *G01L 5/0028* (2013.01); *G05B 2219/40586* (2013.01); *Y10T 74/20305* (2015.01)

(58) Field of Classification Search
CPC ......... G01L 1/16; G01L 5/0061; G01L 5/167; G01L 5/00; G01L 5/226; G01L 5/009; G01L 1/18; Y10S 901/46; B25J 13/085; B25J 9/1694; B25J 9/1633; G01P 15/18; G01P 15/09; H01L 41/042; H01L 41/1132; H01L 41/083; H02N 2/0095
See application file for complete search history.

(56) References Cited

U.S. PATENT DOCUMENTS

| | | | | |
|---|---|---|---|---|
| 4,821,584 | A | * | 4/1989 | Lembke .................. B25J 19/063 310/338 |
| 7,366,585 | B2 | * | 4/2008 | Schnoor ................. B25J 9/1638 414/735 |

(Continued)

FOREIGN PATENT DOCUMENTS

JP          64-044510 A      2/1989

*Primary Examiner* — Harshad R Patel
*Assistant Examiner* — Brandi N Hopkins
(74) *Attorney, Agent, or Firm* — Harness, Dickey & Pierce, P.L.C.

(57) ABSTRACT

A force sensor unit includes a force sensor, a casing housing the force sensor within a space surrounded by one end portion, another end portion, and a side portion, an attachment member having a first attachment portion that can be attached to a robot arm of a robot and a second attachment portion detachably attached to the one end portion of the casing in a position different from that of the first attachment portion, and a wiring cable connected to the force sensor and routed from inside the casing to outside of the casing, wherein a positioning portion for positioning with respect to the robot arm is provided in the first attachment portion, and a part of the wiring cable is provided along a circumferential direction of the side portion.

7 Claims, 17 Drawing Sheets

(56) References Cited

U.S. PATENT DOCUMENTS

| | | | | |
|---|---|---|---|---|
| 9,329,092 B2* | 5/2016 | Nitz | ............................ | G01L 3/02 |
| 2009/0248038 A1* | 10/2009 | Blumenkranz | ......... | B25J 13/085 |
| | | | | 606/130 |
| 2010/0312394 A1* | 12/2010 | Arimitsu | ................. | G01L 5/166 |
| | | | | 700/260 |
| 2012/0205931 A1* | 8/2012 | Ohta | ...................... | B25J 13/085 |
| | | | | 294/213 |
| 2014/0000388 A1* | 1/2014 | Sato | .......................... | G01L 1/04 |
| | | | | 73/862.642 |
| 2014/0053660 A1* | 2/2014 | Kamiya | .................... | G01L 1/16 |
| | | | | 73/862.68 |
| 2014/0067125 A1* | 3/2014 | Niu | ........................ | B25J 9/1638 |
| | | | | 700/258 |
| 2016/0229067 A1* | 8/2016 | Nishimura | ............. | B25J 19/028 |

* cited by examiner

FORCE SENSOR UNIT AND ROBOT ARM INCLUDING A WIRE CABLE ROUTED FROM INSIDE A CASING TO OUTSIDE OF THE CASING

BACKGROUND

1. Technical Field

The present invention relates to a force sensor unit and a robot.

2. Related Art

In related art, industrial robots that perform predetermined works including grasping and carrying objects are known.

As an example of the robot, Patent Document 1 (JP-A-64-44510) discloses a robot having a base, a first arm connected to the base to be turnable about a perpendicular axis, a second arm connected to the first arm about the perpendicular axis, and a rotation and linear-motion link provided to be rotatable and vertically movable in an end part of the second arm. Further, the robot according to Patent Document 1 has a force sensor attached to the rotation and linear-motion link and a finger changer attached to the force sensor. In the robot, a force applied to the finger changer is detected by the force sensor and impedance control is performed based on the detected result.

However, in the robot according to Patent Document 1, the specific method of attaching the force sensor to the rotation and linear-motion link is not disclosed and stable attachment for ensuring the accuracy of the force sensor is not performed.

SUMMARY

An advantage of some aspects of the invention is to provide a force sensor unit that may reduce degradation of accuracy of a force sensor due to an attachment method to a robot arm, and a robot including the force sensor unit.

The invention can be implemented as the following configurations.

A force sensor unit according to an aspect of the invention includes a force sensor, a casing having one end portion, another end portion, and a side portion located between the one end portion and the other end portion and housing the force sensor within a space surrounded by the one end portion, the other end portion, and the side portion, an attachment member having a first attachment portion that can be attached to a robot arm of a robot, and a second attachment portion detachably attached to the one end portion of the casing in a position different from that of the first attachment portion, and a wiring cable connected to the force sensor and routed from inside the casing to outside of the casing, wherein a positioning portion for positioning with respect to the robot arm is provided in the first attachment portion, and a part of the wiring cable is provided along a circumferential direction of the side portion.

According to the force sensor unit according to the aspect of the invention, the positioning portion is provided and the attachment member may be accurately attached to the robot arm, and thereby, the casing may be accurately attached to the robot arm. Further, according to the force sensor unit according to the aspect of the invention, the part of the wiring cable is provided along the side portion of the casing housing the force sensor, and an influence on the measurement (detection) of the force sensor by deformation or displacement of the wiring cable (particularly, displacement in a direction along a center line X1 as a line segment connecting the one end portion and the other end portion) may be reduced. Thereby, degradation of accuracy of the force sensor due to the attachment method to the robot arm may be reduced and differences among individuals may be reduced.

In the force sensor unit according to the aspect of the invention, it is preferable that the positioning portion has a first positioning member and a second positioning member having convex shapes projecting from the first attachment portion, the first positioning member is provided in a center part of the first attachment portion, and the second positioning member is provided at an outer side of the first attachment portion than the first positioning member.

With this configuration, positioning of the attachment member and the casing with respect to the robot arm in the circumferential direction may be properly performed.

In the force sensor unit according to the aspect of the invention, it is preferable that the casing and the attachment member respectively have alignment portions used for determination of a relative position relationship with each other.

With this configuration, alignment between the casing and the attachment member may be easily and properly performed, and positioning of the casing with respect to the robot arm via the attachment member may be easily and properly performed.

In the force sensor unit according to the aspect of the invention, it is preferable that a supporting member having an insertion hole through which the part of the wiring cable is inserted and supporting the part of the wiring cable with respect to the side portion is provided in the side portion.

With this configuration, the part of the wiring cable may be fixed to the side portion while the position of the wiring cable with respect to the side portion is restricted. Therefore, the influence on the measurement (detection) of the force sensor by the displacement of the wiring cable may be further reduced.

In the force sensor unit according to the aspect of the invention, it is preferable that a concave portion opening toward outside of the casing is formed in the side portion, and the part of the wiring cable is provided along the concave portion.

With this configuration, the displacement of the casing in the direction along the center line X1 as the line segment connecting the one end portion and the other end portion may be reduced, and the influence on the measurement (detection) of the force sensor by the displacement of the wiring cable may be further reduced.

In the force sensor unit according to the aspect of the invention, it is preferable that the part of the wiring cable is provided along the side portion in a range at 90° or more in the circumferential direction of the side portion.

With this configuration, the displacement of the casing in the direction along the center line X1 as the line segment connecting the one end portion and the other end portion may be reduced, and the influence on the measurement (detection) of the force sensor by the displacement of the wiring cable may be further reduced.

In the force sensor unit according to the aspect of the invention, it is preferable that the first attachment portion has a first portion and a second portion projecting from the first portion, and a hole through which the part of the wiring cable can be inserted is formed in the second portion.

With this configuration, the position of the part of the wiring cable may be restricted by the second portion and the displacement of the wiring cable may be reduced. Accordingly, the influence on the measurement (detection) of the force sensor by the displacement of the wiring cable may be further reduced. Especially, the attachment member having the first attachment portion having the above described configuration is effective when applied to a horizontal articulated robot.

A robot according to an aspect of the invention includes the force sensor unit according to the aspect of the invention, and the robot arm to which the force sensor unit is attached.

According to the robot of the aspect of the invention, the force sensor unit according to the aspect of the invention is provided, and thereby, the robot in which the degradation of accuracy of the force sensor due to the attachment method of the force sensor unit to the robot arm is reduced and differences among individuals are reduced may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a force sensor unit and a robot according to the invention will be explained in detail based on preferred embodiments shown in the accompanying drawings.

First Embodiment

1. Robot System

Figure 1:
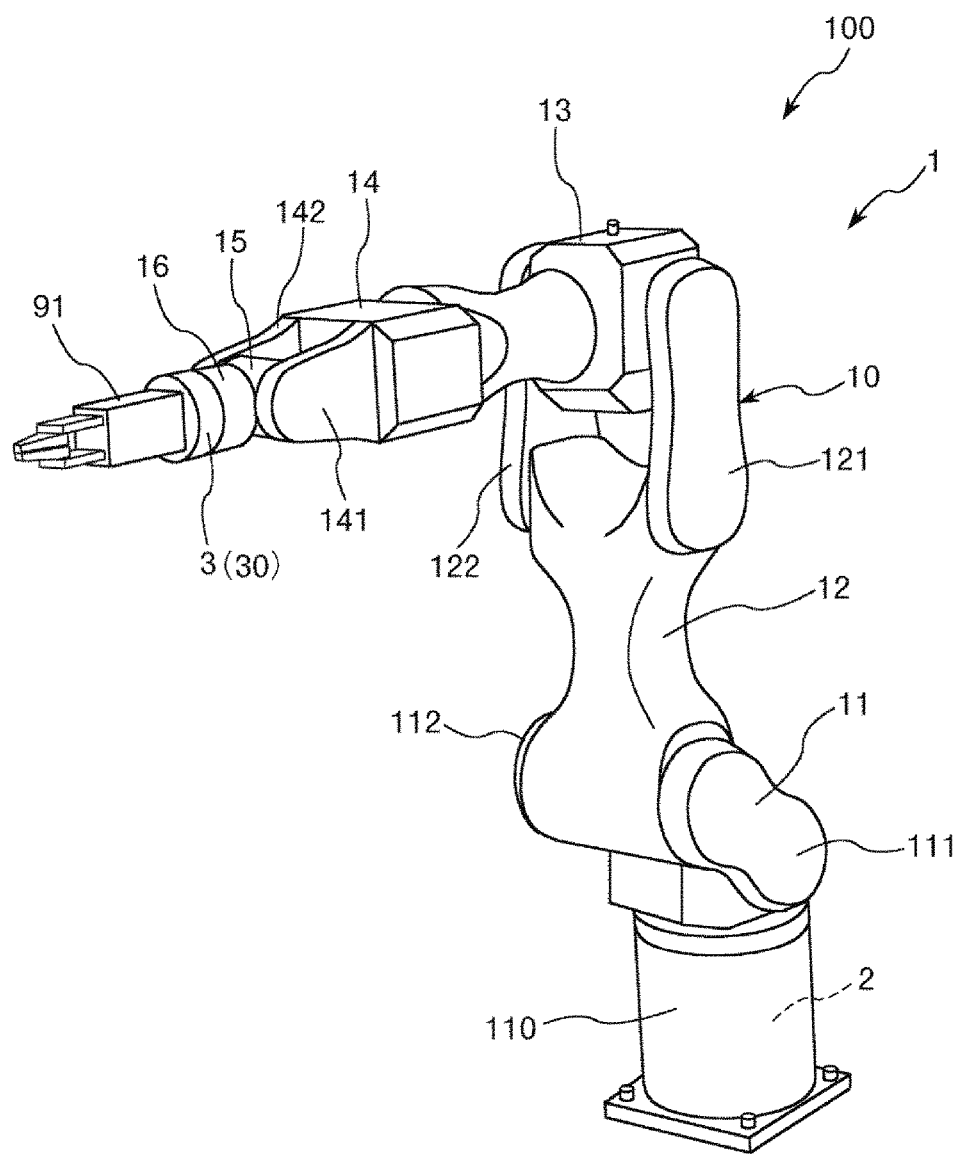
FIG. 1 is a perspective view showing a robot according to the first embodiment of the invention.
Figure 2:
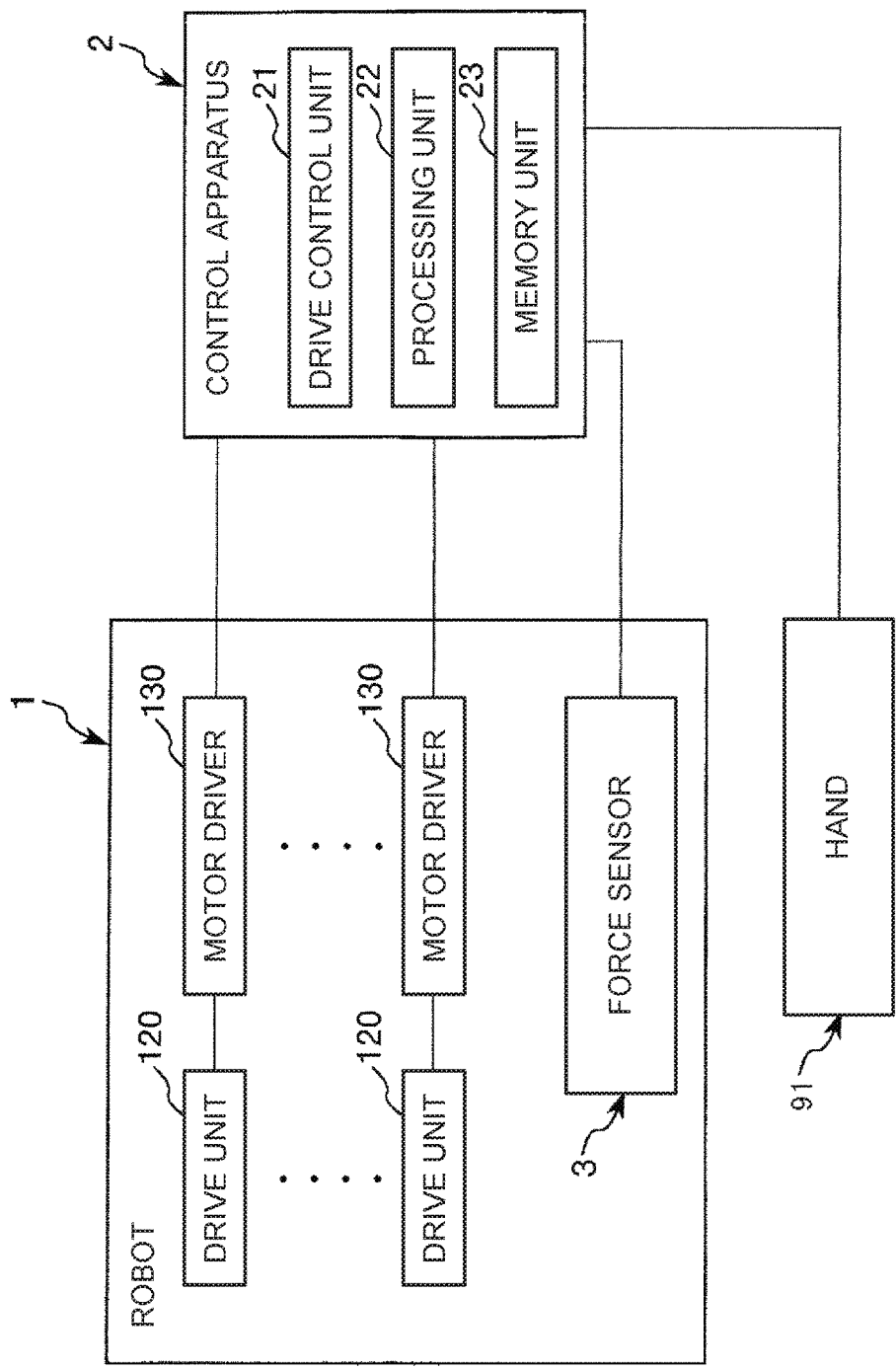
FIG. 2 is a system configuration diagram of the robot and a control apparatus shown in FIG. 1.
Figure 3:
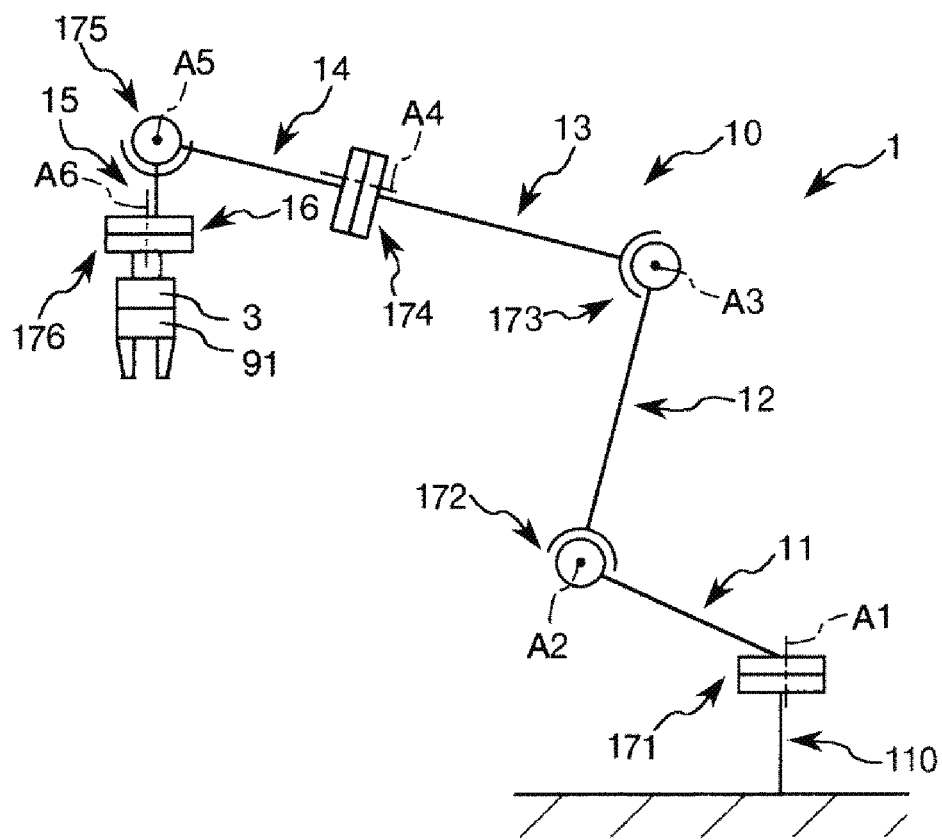
FIG. 3 is a schematic diagram of the robot shown in FIG. 1.

FIG. 1 is a perspective view showing a robot according to the first embodiment of the invention. FIG. 2 is a system configuration diagram of the robot and a control apparatus shown in FIG. 1. FIG. 3 is a schematic diagram of the robot shown in FIG. 1. Hereinafter, the downside (base 110 side) in FIG. 1 is referred to as "proximal end side" and the opposite side (the distal end side of a robot arm 10) is referred to as "distal end side". Further, upward and downward directions in FIG. 1 are referred to as "vertical directions" and rightward and leftward directions are referred to as "horizontal directions".

A robot system 100 shown in FIG. 1 includes a robot 1 as an example of the robot according to the invention and a control apparatus 2 that controls operation of the robot 1. The robot system 100 is used in works of grasping, carrying, assembly, etc. of objects (not shown) including electronic components and electronic apparatuses. Note that, in the embodiment, the explanation is made with the robot 1 and the control apparatus 2 separately provided, however, it may be considered that the robot 1 has the control apparatus 2.

Robot

The robot 1 is the so-called six-axis vertical articulated robot and may perform works of grasping, carrying, assembly, etc. of objects.

As shown in FIG. 1, the robot 1 has a base 110, a robot arm 10 (manipulator) connected to the base 110, and a force sensor unit 3 detachably attached to the distal end part of the robot arm 10. As shown in FIG. 2, the robot 1 includes a plurality of drive units 120 and a plurality of motor drivers 130 that generate power for driving the robot arm 10 shown in FIG. 1.

Further, as shown in FIG. 1, a hand 91 (end effector) is detachably attached to the distal end part (the part on the opposite side to the robot arm 10) of the force sensor unit 3.

As below, the respective parts of the robot 1 will be sequentially explained.

Base

The base 110 shown in FIG. 1 is a part attached to a predetermined location within a work area in which the robot 1 works and supports the robot arm 10. Further, in the embodiment, the control apparatus 2 is provided within the base 110. Note that the control apparatus 2 may be partially or entirely provided within the robot 1 or separately provided from the robot 1.

Robot Arm

The robot arm 10 includes a first arm 11 (arm), a second arm 12 (arm), a third arm 13 (arm), a fourth arm 14 (arm), a fifth arm 15 (arm), and a sixth arm 16 (arm). The first arm 11 is connected to the upper end part of the base 110. The first arm 11, the second arm 12, the third arm 13, the fourth arm 14, the fifth arm 15, and the sixth arm 16 are sequentially coupled from the proximal end side toward the distal end side.

The first arm 11 includes a pair of supporting parts 111, 112 having longitudinal shapes opposed to each other. The supporting parts 111, 112 are used for connection to the second arm 12.

The second arm 12 has a longitudinal shape. The proximal end portion of the second arm 12 is provided between the supporting parts 111, 112 and attached to the supporting parts 111, 112 to be connected to the first arm 11. Further, the second arm 12 has a pair of supporting parts 121, 122 opposed to each other in the distal end part thereof. The supporting parts 121, 122 are used for connection to the third arm 13.

The third arm 13 has a longitudinal shape. The third arm 13 is provided between the supporting parts 121, 122 and attached to the supporting parts 121, 122 to be connected to the second arm 12.

The fourth arm 14 is connected to the opposite end to the end of the third arm 13 to which the second arm 12 is connected. The fourth arm 14 has a longitudinal shape and has a pair of supporting parts 141, 142 opposed to each other on the distal end part thereof. The supporting parts 141, 142 are used for connection to the fifth arm 15.

The fifth arm 15 is located between the supporting parts 141, 142 and attached to the supporting parts 141, 142 to be connected to the fourth arm 14.

The sixth arm 16 has a circular plate shape in a plan view, and is connected to the distal end part of the fifth arm 15. Further, the force sensor unit 3 is detachably attached to the distal end part (distal end surface) of the sixth arm 16. The hand 91 is detachably attached to the opposite end to the end of the force sensor unit 3 to which the sixth arm 16 is connected.

Note that, in the embodiment, as the end effector, the hand 91 is taken as an example, however, the end effector is not limited to the hand 91. As the end effector, e.g. a configuration having a suction mechanism that suctions an object, a machining mechanism that machines an object, or the like may be employed.

Further, as shown in FIG. 3, the base 110 and the first arm 11 are coupled via a rotation shaft member 171. By the rotation shaft member 171, the first arm 11 is rotatable about a first rotation axis A1 along the vertical directions with respect to the base 110. Further, the first arm 11 and the second arm 12 are coupled via a rotation shaft member 172. By the rotation shaft member 172, the second arm 12 is rotatable about a second rotation axis A2 along the horizontal directions with respect to the first arm 11. Furthermore, the second arm 12 and the third arm 13 are coupled via a rotation shaft member 173. By the rotation shaft member 173, the third arm 13 is rotatable about a third rotation axis A3 along the horizontal directions with respect to the second arm 12. The third arm 13 and the fourth arm 14 are coupled via a rotation shaft member 174. By the rotation shaft member 174, the fourth arm 14 is rotatable about a fourth rotation axis A4 orthogonal to the third rotation axis A3 with respect to the third arm 13. Further, the fourth arm 14 and the fifth arm 15 are coupled via a rotation shaft member 175. By the rotation shaft member 175, the fifth arm 15 is rotatable about a fifth rotation axis A5 orthogonal to the fourth rotation axis A4 with respect to the fourth arm 14. Furthermore, the fifth arm 15 and the sixth arm 16 are coupled via a rotation shaft member 176. By the rotation shaft member 176, the sixth arm 16 is rotatable about a sixth rotation axis A6 orthogonal to the fifth rotation axis A5 with respect to the fifth arm 15.

The robot 1 has the drive units 120 shown in FIG. 2 in the number (six in the embodiment) corresponding to the respective arms 11 to 16. The plurality of drive units 120 respectively have motors that generate drive power for rotating the respective arms 11 to 16 and reducers that decelerate the drive power of the motors (not shown). Thereby, the drive power of the motors is transmitted to the arms 11 to 16 via the reducers, and the arms 11 to 16 respectively rotate. Note that the respective arms 11 to 16 are controlled by the control apparatus 2 via the plurality of (six in the embodiment) motor drivers 130 electrically connected to the corresponding drive units.

Further, in the respective drive units 120, e.g. angle sensors such as encoders or rotary encoders (not shown) are provided. Thereby, the rotation angles of the rotation shafts of the motors or reducers of the respective drive units 120 may be detected.

Force Sensor Unit

The force sensor unit 3 shown in FIG. 1 has a force sensor 30. As the force sensor 30, a six-axis force sensor that may simultaneously detect force components in the translational three axis directions and moment components about rotational three axis directions may be used. Therefore, according to the force sensor unit 3, forces and moment applied via the hand 91 may be detected. The force sensor unit 3 will be described later in detail.

Hand

The hand 91 shown in FIG. 1 has a connecting part having a rectangular column shape connected to the force sensor unit 3, and two (a pair of) fingers provided on the opposite surface to the surface of the connecting part connected to the force sensor unit 3. The hand 91 grasps and releases the object by opening and closing the fingers under the control of the control apparatus 2.

Control Apparatus

The control apparatus 2 includes a personal computer (PC) containing a CPU (Central Processing Unit), RAM (Random Access Memory), ROM (Read Only Memory) etc. or the like. Further, the control apparatus 2 has a drive control unit 21, a processing unit 22, and a memory unit 23. For example, the drive control unit 21 has a function of respectively independently controlling driving of the plurality of drive units 120 (e.g. angular velocities, rotation angles, etc.) based on detection results (signals) input from the force sensor 30. The processing unit 22 has a function of performing various calculations etc. based on various signals (including detection results). The memory unit 23 has a function of recording programs for controlling the driving of the drive units 120 (operation of the robot 1), various signals, etc.

The control apparatus 2 controls the driving of the plurality of drive units 120 using the detection results of the force sensor 30. For example, the control apparatus 2 performs predetermined control including impedance control (force control) and position control. The control apparatus 2 in the embodiment controls the driving of the plurality of drive units 120 using the detection results of the force sensor 30, and thereby, may perform higher-accuracy motion control of the robot 1.

2. Force Sensor Unit

Next, the force sensor unit will be specifically described.

Figure 4:
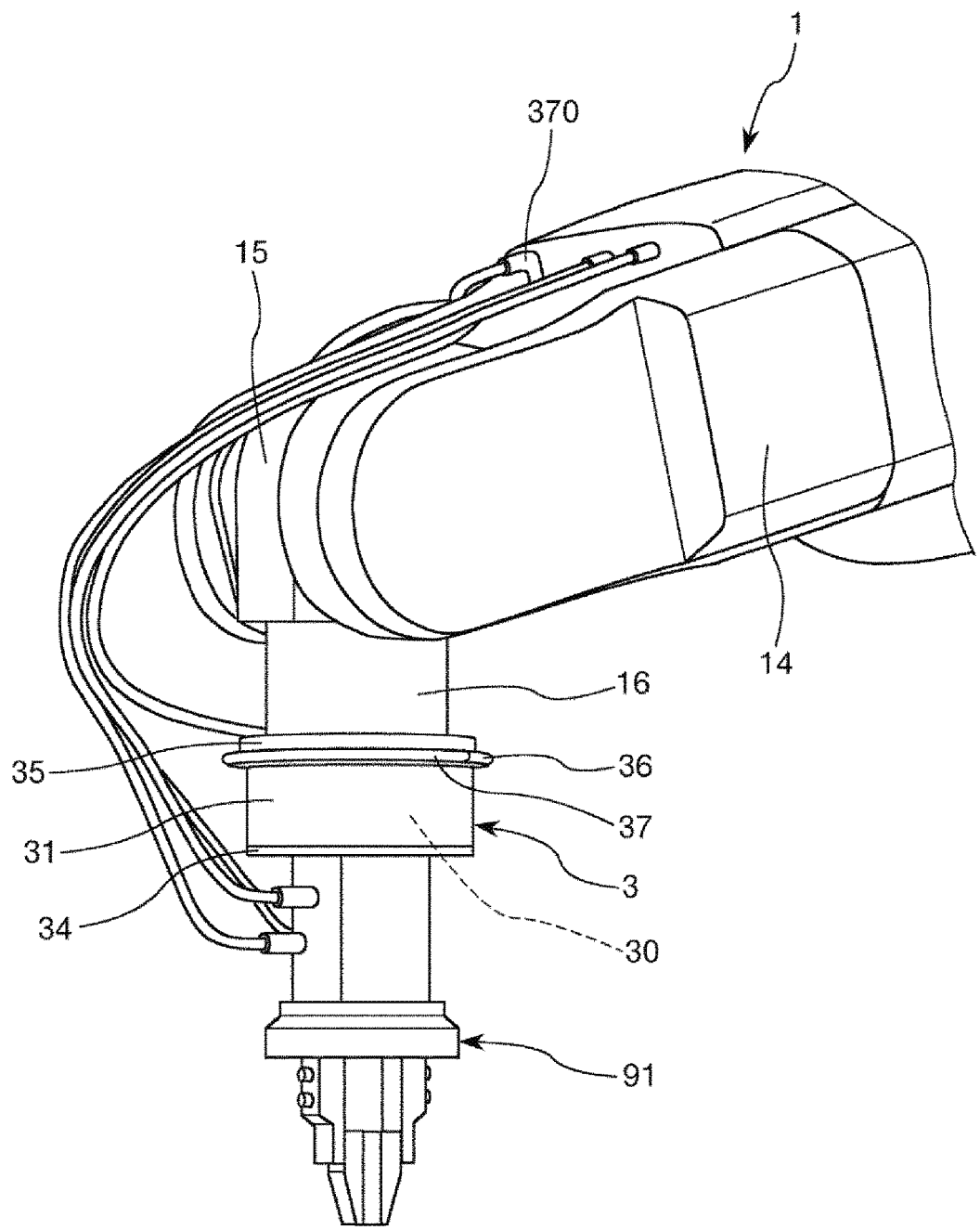
FIG. 4 shows a state in which a force sensor unit is attached to a robot arm shown in FIG. 1.
Figure 5:
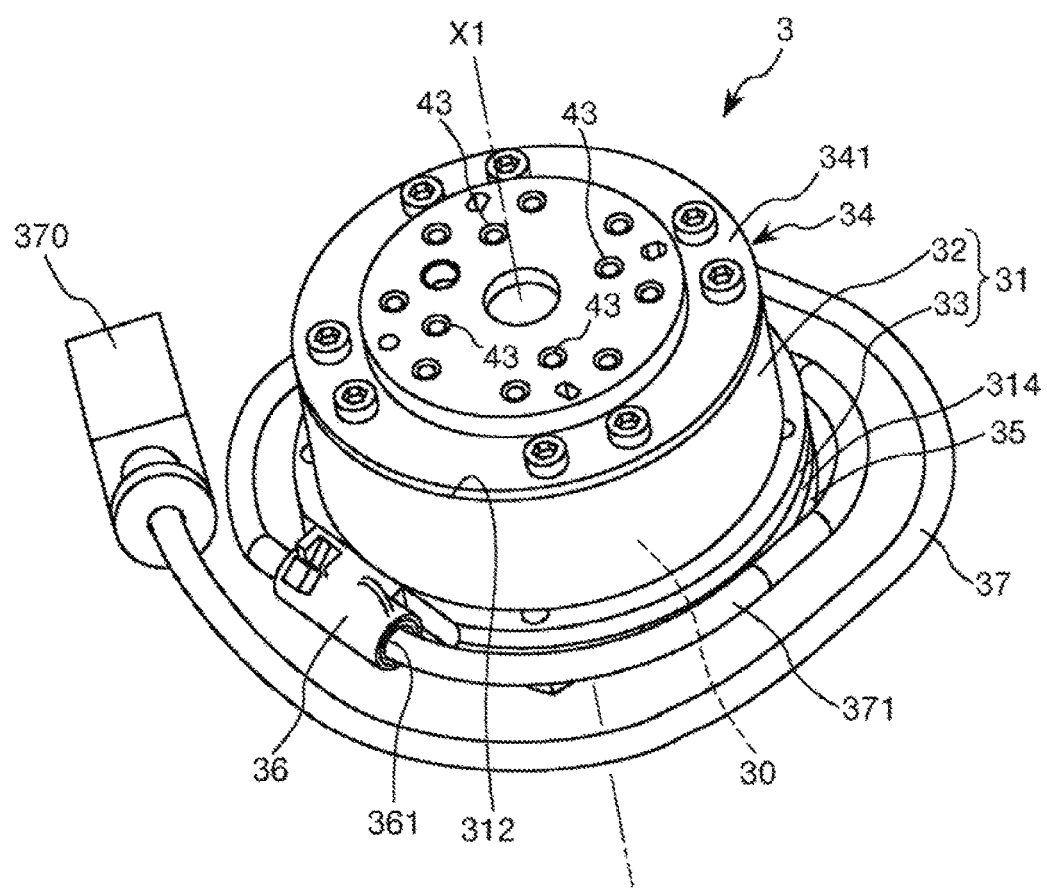
FIG. 5 is a perspective view of the force sensor unit shown in FIG. 4 as seen from a hand-side attachment member.
Figure 6:
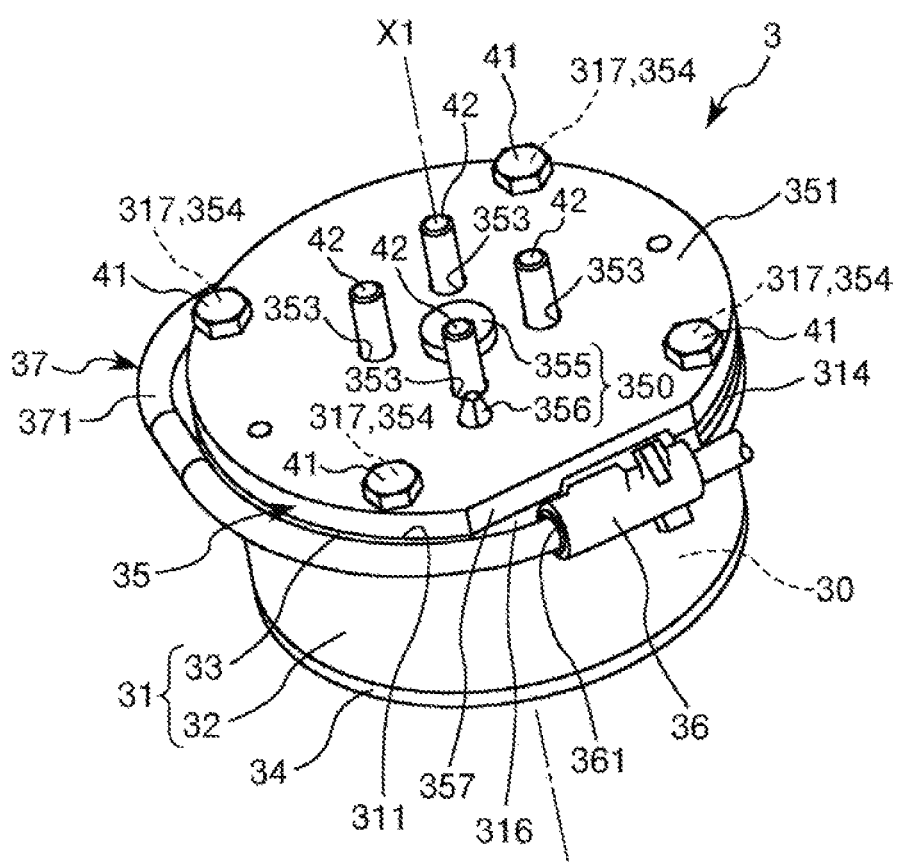
FIG. 6 is a perspective view of the force sensor unit shown in FIG. 4 as seen from an attachment member provided on a robot arm side.
Figure 7:
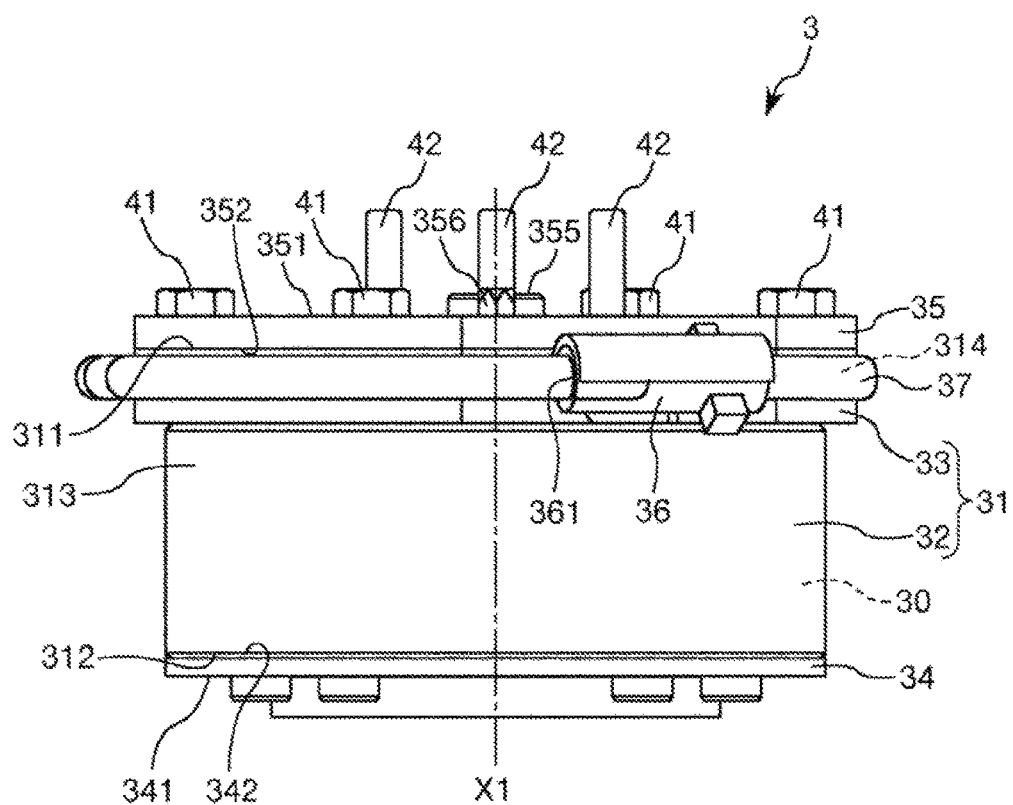
FIG. 7 is a side view of the force sensor unit shown in FIG. 4.
Figure 8:
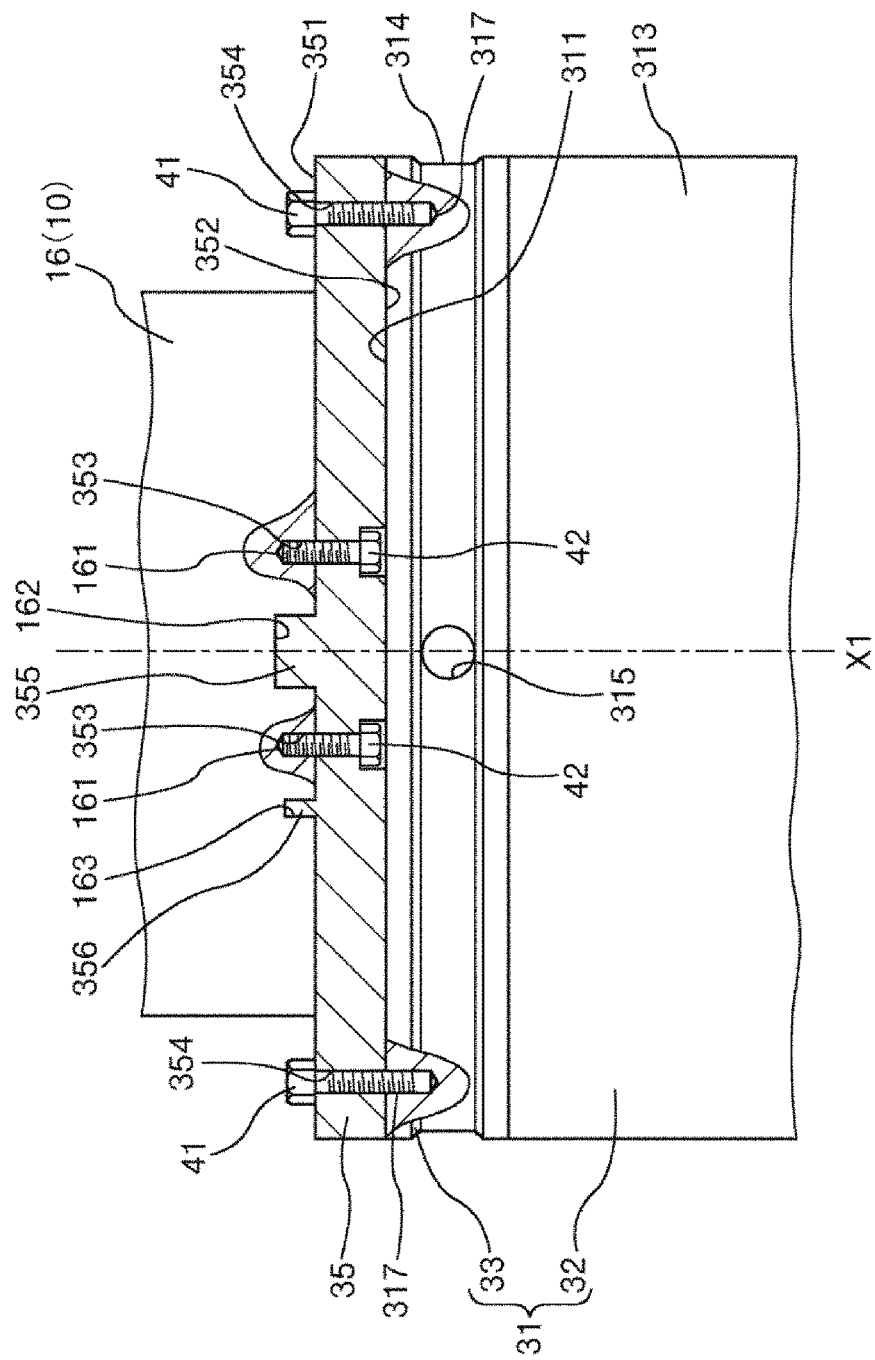
FIG. 8 is a diagram for explanation of an attachment method of the force sensor unit to the robot arm.
Figure 9:
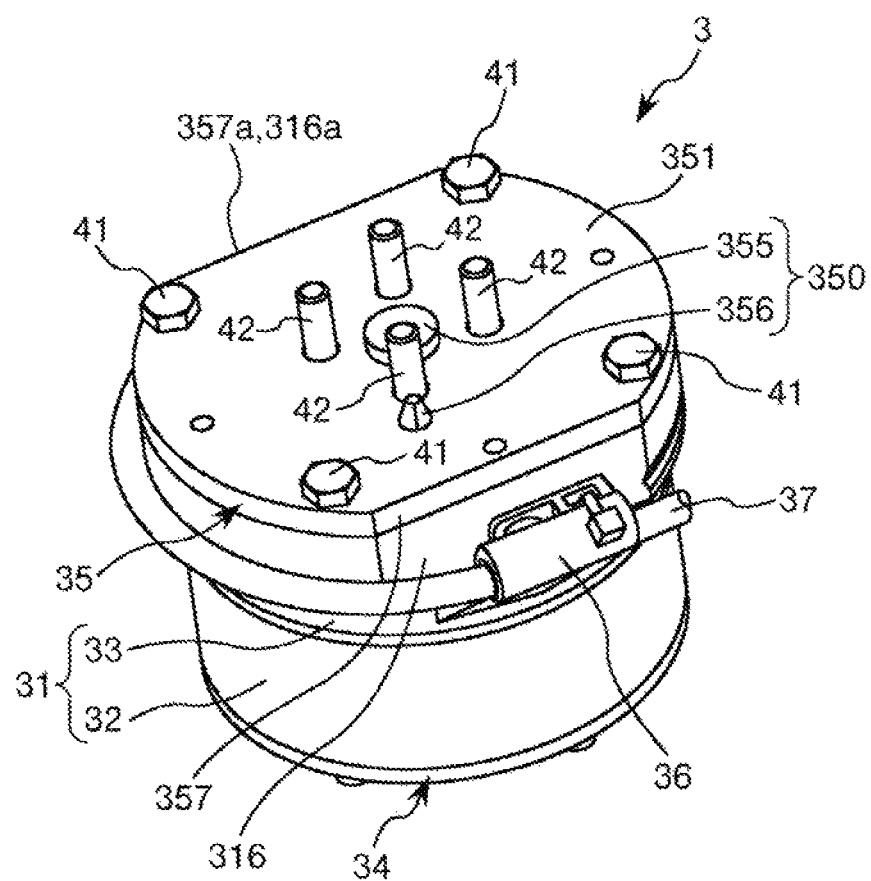
FIG. 9 shows a modified example of a force sensor shown in FIG. 6.

FIG. 4 shows a state in which the force sensor unit is attached to the robot arm shown in FIG. 1. FIG. 5 is a perspective view of the force sensor unit shown in FIG. 4 as seen from a hand-side attachment member. FIG. 6 is a perspective view of the force sensor unit shown in FIG. 4 as seen from an attachment member provided on the robot arm side. FIG. 7 is a side view of the force sensor unit shown in FIG. 4. FIG. 8 is a diagram for explanation of an attachment method of the force sensor unit to the robot arm. FIG. 9 shows a modified example of the force sensor shown in FIG. 6. Hereinafter, the downside in FIG. 7 is referred to as "distal end side" and the opposite side is referred to as "proximal end side".

As shown in FIG. 4, the force sensor unit 3 is provided between the distal end part of the robot arm 10 and the hand 91 and detachably attached to them.

As shown in FIG. 4, the force sensor unit 3 has the force sensor 30, a casing 31, an attachment member 35 (first attachment member), a hand-side attachment member 34 (second attachment member), a supporting member 36, and a wiring cable 37. The attachment member 35, the casing 31, and the hand-side attachment member 34 are sequentially coupled from the proximal end side toward the distal end side.

As below, the respective parts of the force sensor unit 3 will be sequentially explained.

Force Sensor

As described above, in the embodiment, the six-axis force sensor having the function of detecting external forces (including moment) is used as the force sensor 30. Note that the force sensor 30 is not limited to the six-axis force sensor, but may be a three-axis force sensor. Further, as the force sensor 30, any type including a stain gauge-type, capacitance-type, and quartz piezoelectric element-type may be used.

Casing

The casing 31 shown in FIGS. 5 to 7 has a main body part 32 having an internal space and an attachment part (attachment) 33 connected to the main body part 32.

As shown in FIG. 7, the casing 31 having the main body part 32 and the attachment part 33 includes one end portion 311 (one end surface) and another end portion 312 (another end surface) provided apart to face each other and a side portion 313 (side surface) located between the one end portion 311 and the other end portion 312 and connecting these portions. The one end portion 311 and the other end portion 312 have circular plate shapes in the plan view and the side portion 313 has a tubular (nearly cylindrical) shape. The force sensor 30 is housed within a space surrounded by these one end portion 311, other end portion 312, and side portion 313. Note that the attachment part 33 is formed by the one end portion 311 and the upper part of the side portion 313, and the main body part 32 is formed by the other end portion 312 and the center part and lower part of the side portion 313. Further, the shapes of the one end portion 311, the other end portion 312, and the side portion 313 are not limited to those illustrated, but the one end portion 311 and the other end portion 312 may have rectangular shapes and the side portion 313 may have a rectangular column shape.

As shown in FIG. 8, in the upper part of the side portion 313 (the side surface of the attachment part 33), a concave portion 314 as a groove formed to open toward outside of the casing 31 along a circumferential direction around a center line X1 (line segment) in the height direction of the casing 31 is provided. The concave portion 314 is provided over the entire circumference of the side portion 313. The concave portion 314 has a function of restricting displacement of a part of the wiring cable 37, which will be described later, in the center line X1 direction (height direction) of the casing 31 by guiding the part of the wiring cable 37. Note that the concave portion 314 may be formed in a part of the outer circumference of the side portion 313. It is preferable that the concave portion 314 is formed in at least a range in which the wiring cable 37 to be described later is guided.

Further, a through hole 315 that allows communication between inside (space) of the casing 31 and outside is formed in the middle of the concave portion 314. Apart of the wiring cable 37 is inserted into the through hole 315.

As shown in FIG. 6, in the upper part of the side portion 313 (the side surface of the attachment part 33), a cutout portion 316 partially cut out along the center line X1 is provided. The cutout portion 316 functions as an alignment portion for determining a relative position relationship between the casing 31 and the attachment member 35, which will be described later. Further, the cutout portion 316 has a flat surface and has a function as a connecting surface of connecting (fixing) the supporting member 36, which will be described later, to the casing 31.

As shown in FIG. 8, in the upper part of the casing 31, a plurality of female screws 317 opening upward (one end portion 311) used for connecting the casing 31 and the attachment member 35 are formed. The plurality of female screws 317 are provided on the edge side of the one end portion 311 of the casing 31 at equal intervals along the circumferential direction of the casing 31.

Hand-Side Attachment Member

As shown in FIG. 5, the hand-side attachment member 34 has a plate shape and its plan view shape corresponds to the plan view shape of the other end portion 312 of the casing 31.

As shown in FIG. 7, the hand-side attachment member 34 has a hand-side attachment portion 341 (hand-side attachment surface) and a casing-side attachment portion 342 (casing-side attachment surface) in a front-back relation. The hand-side attachment portion 341 is detachably attached to the proximal end portion of the hand 91, and the casing-side attachment portion 342 is fixed to the other end portion 312 of the casing 31. Note that the casing-side attachment portion 342 may be detachably connected to the other end portion 312.

The hand-side attachment portion 341 has an outer edge part and a center part having a thickness larger than that of the outer edge part and further protruding toward the proximal end side than the outer edge part. As shown in FIG. 5, a plurality of female screws 43 used for attachment to the hand 91 are formed in the center part. The hand 91 may be connected to the hand-side attachment portion 341 using male screws (not shown) corresponding to the female screws 43.

Attachment Member

As shown in FIG. 6, the attachment member 35 has a plate shape and its plan view shape corresponds to the plan view shape of the one end portion 311 of the casing 31.

As shown in FIG. 7, the attachment member 35 has a first attachment portion 351 (first attachment surface) and a second attachment portion 352 (second attachment surface) in a front-back relation. The first attachment portion 351 is detachably attached to the distal end part of the robot arm 10 and the second attachment portion 352 is detachably attached to the one end portion 311 of the casing 31.

As shown in FIG. 8, a plurality of through holes 353 penetrating the attachment member 35 in the thickness direction are formed in the center part of the attachment member 35. The plurality of through holes 353 are provided nearly at equal intervals along the circumferential direction of the attachment member 35. These plurality of through holes 353 are formed to correspond to a plurality of female screws 161 formed in the distal end part (the distal end part of the sixth arm 16) of the robot arm 10. Further, male screws 42 (bolts) are inserted into the respective through holes 353 and the respective female screws 161, and the male screws 42 are screwed into the female screws 161 via the through holes 353. Thereby, the attachment member 35 is connected to the distal end part of the robot arm 10. The attachment member 35 may be stably attached to the robot arm 10 by the simple configuration of screwing using the male screws 42.

Further, a plurality of through holes 354 penetrating the attachment member 35 in the thickness direction are formed in the edge part of the attachment member 35. The plurality of through holes 354 are provided at nearly equal intervals along the circumferential direction of the attachment member 35. These plurality of through holes 354 are formed to correspond to the plurality of female screws 317 formed in the above described one end portion 311 of the casing 31. Male screws 41 (bolts) are inserted into the respective through holes 354 and the respective female screws 317, and the male screws 41 are screwed into the female screws 317 via the through holes 354. Thereby, the attachment member 35 is connected to the casing 31. The attachment member 35 may be stably attached to the casing 31 by the simple configuration of screwing using the male screws 41.

As shown in FIG. 6, a positioning portion 350 for positioning of the attachment member 35 with respect to the distal end part of the robot arm 10 is provided on the first attachment portion 351 of the attachment member 35. The positioning portion 350 has a first positioning member 355 and a second positioning member 356 having convex shapes projecting from the first attachment portion 351 toward upside (distal end side).

The first positioning member 355 is provided at the center (center part) of the first attachment portion 351. On the other hand, the second positioning member 356 is provided at the outer side of the first attachment portion 351 than the first positioning member 355. Further, as shown in FIG. 8, the first positioning member 355 is formed to correspond to a concave portion 162 formed in the distal end part of the robot arm 10. On the other hand, the second positioning member 356 is formed to correspond to a concave portion 163 formed in the distal end part of the robot arm 10.

The attachment member 35 is attached to the distal end part of the robot arm 10 so that the first positioning member 355 having the above described configuration may be placed in the concave portion 162 and the second positioning member 356 may be placed in the concave portion 163. Thereby, relative alignment between the attachment member 35 and the robot arm 10 may be performed.

Note that, in the embodiment, the positioning portion 350 has the first positioning member 355 and the second positioning member 356 as two positioning members, however, the number of positioning members is not limited to two. The number of positioning members of the positioning portion 350 may be at least two or more and may be three or more. Further, the positions of the plurality of positioning members are arbitrary, not limited to the positions shown in the drawings.

As shown in FIG. 6, in a part of the attachment member 35 (a part on the side), a cutout portion 357 cut out along the thickness direction is provided. The cutout portion 357 has a flat surface. The cutout portion 357 functions as an alignment portion for determining the relative position relationship between the attachment member 35 and the casing 31. Specifically, the casing 31 is attached to the attachment member 35 so that the cutout portion 357 and the cutout portion 316 may be located on the same plane. Thereby, the position of the casing 31 with respect to the attachment member 35, particularly, the position in the circumferential direction (rotation direction) may be easily and properly determined.

Supporting Member

As shown in FIGS. 5 and 6, the supporting member 36 is a member in a circular cylinder shape having an insertion hole 361 in which a part of the wiring cable 37 is inserted. A part of the supporting member 36 on the side is fixed (connected) to the cutout portion 357 of the above described casing 31. Thereby, the supporting member 36 is attached to the casing 31 so that the longitudinal direction of the insertion hole 361 may be along the circumferential direction of the casing 31. Therefore, according to the supporting member 36, the part of the wiring cable 37 may be maintained along the side portion 313.

For the supporting member 36, e.g. a member formed by rolling a sheet-like material formed using a soft material such as silicon rubber and wrapping a relatively soft material such as a plastic material around the rolled material may be used. Thereby, loss or the like of the inserted wiring cable 37 may be prevented.

Wiring Cable

The wiring cable 37 is electrically connected to the force sensor 30, routed from inside the casing 31 through the through hole 315 out of the casing 31, and routed to the side portion 313 of the casing 31. More specifically, as shown in FIG. 5, the part of the wiring cable 37 is wound around the side portion 313 of the casing 31 along the concave portion 314, and inserted into the insertion hole 361 of the supporting member 36. Thereby, a wound portion 371 as apart of the wiring cable 37 wound around the side portion 313 from the through hole 315 to the supporting member 36 is provided along the circumferential direction of the side portion 313. Further, a connector 370 is provided in one end portion of the wiring cable 37. As shown in FIG. 4, the connector 370 is connected to a connector of the robot arm 10 and electrically connected to the control apparatus 2 via wiring (not shown). Thereby, the force sensor 30 is electrically connected to the control apparatus 2.

Regarding the above described force sensor unit 3, first, the attachment member 35 is attached to the robot arm 10 using the male screws 42, and then, the casing 31 with the hand-side attachment member 34, the supporting member 36, and the part of the wiring cable 37 mounted thereon is attached to the attachment member 35 using the male screw 41. Then, the connector 370 is connected to the connector of the robot arm 10. Thereby, as shown in FIG. 4, the force sensor unit 3 may be attached to the robot arm 10.

Note that, as the respective constituent materials of the above described casing 31, hand-side attachment member 34, and attachment member 35, in view of durability or the like, e.g. various metals such as iron, nickel, copper, aluminum or alloys containing at least a kind of the metals may be used.

The above described force sensor unit 3 as an example of the force sensor unit according to the invention has the force sensor 30, the casing 31, the attachment member 35, and the wiring cable 37. The casing 31 has the one end portion 311, the other end portion 312, and the side portion 313 located between the one end portion 311 and the other end portion 312, and houses the force sensor 30 within the space surrounded by the one end portion 311, the other end portion 312, and the side portion 313. The attachment member 35 has the first attachment portion 351 that can be attached to the robot arm 10 of the robot 1, and the second attachment portion 352 provided in the different position from that of the first attachment portion 351 and detachably attached to the one end portion 311 of the casing 31. The wiring cable 37 is connected to the force sensor 30 and routed from inside the casing 31 to the outside of the casing 31. Further, the positioning portion 350 for positioning with respect to the robot arm 10 is provided in the first attachment portion 351, and the wound portion 371 as the part of the wiring cable 37 is provided along the circumferential direction of the side portion 313.

According to the force sensor unit 3, the positioning portion 350 is provided, and the attachment member 35 may be attached to the robot arm 10 after the positioning of the attachment member 35 with respect to the robot arm 10 using the positioning portion 350. Accordingly, the attachment member 35 may be accurately attached to the robot arm 10, and thereby, the casing 31 attached to the attachment member 35 may be accurately attached to the robot arm 10. Particularly, the position of the force sensor unit 3 in the circumferential direction with respect to the robot arm 10 may be accurately positioned. Accordingly, according to the force sensor unit 3, the correspondence between the robot coordinate system of the robot 1 and the coordinate system of the force sensor 30 may be accurately made. Further, according to the force sensor unit 3, the wound portion 371 as the part of the wiring cable 37 is provided along the side portion 313, and thereby, the influence on the measurement (detection) of the force sensor 30 by deformation or displacement of the wiring cable 37, particularly, displacement along the center line X1 may be reduced. Accordingly, generation of an outlier in the detection result of the force sensor 30 due to an interference by the wiring cable 37 may be reduced. Thereby, degradation of accuracy of the force sensor 30 due to the attachment method to the robot arm 10 may be reduced and differences among individuals may be reduced.

The robot 1 as an example of the robot according to the invention has the force sensor unit 3 and the robot arm 10 to which the force sensor unit 3 is attached. According to the robot 1, the force sensor unit 3 is provided, and thereby, the robot 1 in which the degradation of accuracy of the force sensor 30 due to the attachment method of the force sensor unit to the robot arm 10 is reduced and differences among individuals are reduced may be provided.

Further, as described above, the positioning portion 350 has the first positioning member 355 and the second positioning member 356 having the convex shapes projecting from the first attachment portion 351. The first positioning member 355 is provided in the center part of the first attachment portion 351 and the second positioning member 356 is provided at the outer side of the first attachment portion 351 than the first positioning member 355. Using the positioning portion 350, as described above, the first positioning member 355 is placed in the concave portion 162 and the second positioning member 356 is placed in the concave portion 163, and thereby, positioning of the attachment member with respect to the robot arm 10 may be performed. Particularly, as described above, the first positioning member 355 is provided at the center (center part) of the first attachment portion 351 and the second positioning member 356 is provided in the different position from that, and thereby, the positioning of the attachment member 35 and the casing 31 with respect to the robot arm 10 in the circumferential direction may be accurately performed.

Furthermore, as described above, the casing 31 has the cutout portion 316 and the attachment member 35 has the cutout portion 357. These cutout portions 316, 357 respectively function as the alignment portions used for determining relative position relationship between the casing 31 and the attachment member 35. Specifically, as described above, the casing 31 is attached to the attachment member 35 so that the cutout portion 357 and the cutout portion 316 may be located on the same plane. Thereby, the alignment between the casing 31 and the attachment member 35 may be easily and accurately performed, and accordingly, the positioning of the casing 31 via the attachment member 35 with respect to robot arm 10 may be easily and accurately performed.

Here, the alignment between the attachment member 35 and the casing 31 is briefly explained. First, the casing 31 is overlapped with the attachment member 35 and the casing 31 is rotated about the center line X1 with respect to the attachment member 35. In this regard, rough alignment in the circumferential direction is made so that the cutout portions 316, 357 may overlap. Then, fine adjustment for positioning the cutout portions 316, 357 on the same plane is made while the casing 31 is rotated with respect to the attachment member 35. Thereby, one through hole 354 and one female screw 317 are aligned on a line. The male screw 41 is inserted and screwed into the aligned through hole 354 and female screw 317. Thereby, the alignment between the attachment member 35 and the casing 31 may be performed easily and highly accurately, and the casing 31 may be easily and properly attached to the attachment member 35.

Note that the numbers of the cutout portions 316, 357 are respectively not limited to one, but may be arbitrary. Here, FIG. 9 shows a modified example of the force sensor shown in FIG. 6. As shown in FIG. 9, the casing 31 has a cutout portion 316 and a cutout portion 316a formed on the opposite side. Note that the configuration of the cutout portion 316a is the same as the configuration of the cutout portion 316 except that the position in which the portion is formed is different. Further, the attachment member 35 has a cutout portion 357 and a cutout portion 357a formed on the opposite side. Note that the configuration of the cutout portion 357a is the same as the configuration of the cutout portion 357 except that the position in which the portion is formed is different. The plurality of cutout portions 316, 316a, 357, 357a are provided, and thereby, the alignment between the casing 31 and the attachment member 35 may be performed more accurately. Whether or not the configuration including the plurality of cutout portions 316, 316a, 357, 357a is employed may be determined according to the type of the robot to which the force sensor unit 3 is attached or the like.

In the embodiment, the cutout portions 316, 357 are used as the alignment portions, however, the configuration of the alignment portions is not limited to that as long as the alignment between the casing 31 and the attachment member 35 may be performed. For example, the alignment portions may include marks, grooves, or the like that may be used as reference for alignment.

As described above, on the side portion 313, the supporting member 36 having the insertion hole 361 in which the part of the wiring cable 37 (specifically, the wound portion 371) is inserted and supporting the wound portion 371 as the part of the wiring cable 37 with respect to the side portion 313 is provided. Thereby, the part of the wiring cable 37 may be fixed to the side portion 313 while the position of the wiring cable with respect to the side portion 313 is restricted. Accordingly, displacement of the wiring cable 37, particularly, the wound portion 371 may be reduced, and therefore, the influence on the measurement (detection) of the force sensor 30 by the displacement of the wiring cable 37 may be further reduced.

Further, on the side portion 313, the concave portion 314 as the groove opening toward outside of the casing 31 is formed. The wound portion 371 as the part of the wiring cable 37 is provided along the concave portion 314. Thereby, the displacement of the wiring cable 37, particularly, the wound portion 371 in the center line X1 direction may be reduced and the influence on the measurement (detection) of the force sensor by the displacement of the wiring cable 37 may be further reduced. Accordingly, generation of an outlier in the detection result of the force sensor 30 due to an interference by the wiring cable 37 may be reduced more effectively.

The wound portion 371 as the part of the wiring cable 37 is provided along the concave portion 314 in a range at 90° or more in the circumferential direction of the side portion 313. Note that, in the embodiment, the wound portion 371 is provided along the side portion 313 in the range at about 90° or more in the circumferential direction, however, the range in which the wound portion 371 is provided along the side portion 313 is not limited to at 90°, but arbitrary. Note that, in the state in which the force sensor unit 3 is attached to the robot arm 10, the range in which the wound portion 371 is provided along the side portion 313 is preferably from 90° to 450° and more preferably from 180° to 360°. Thereby, the displacement of the wiring cable 37 in the direction along the center line X1 of the casing 31 may be reduced and generation of an outlier in the detection result of the force sensor 30 due to an interference by the wiring cable 37 may be reduced particularly effectively.

Second Embodiment

Figure 10:
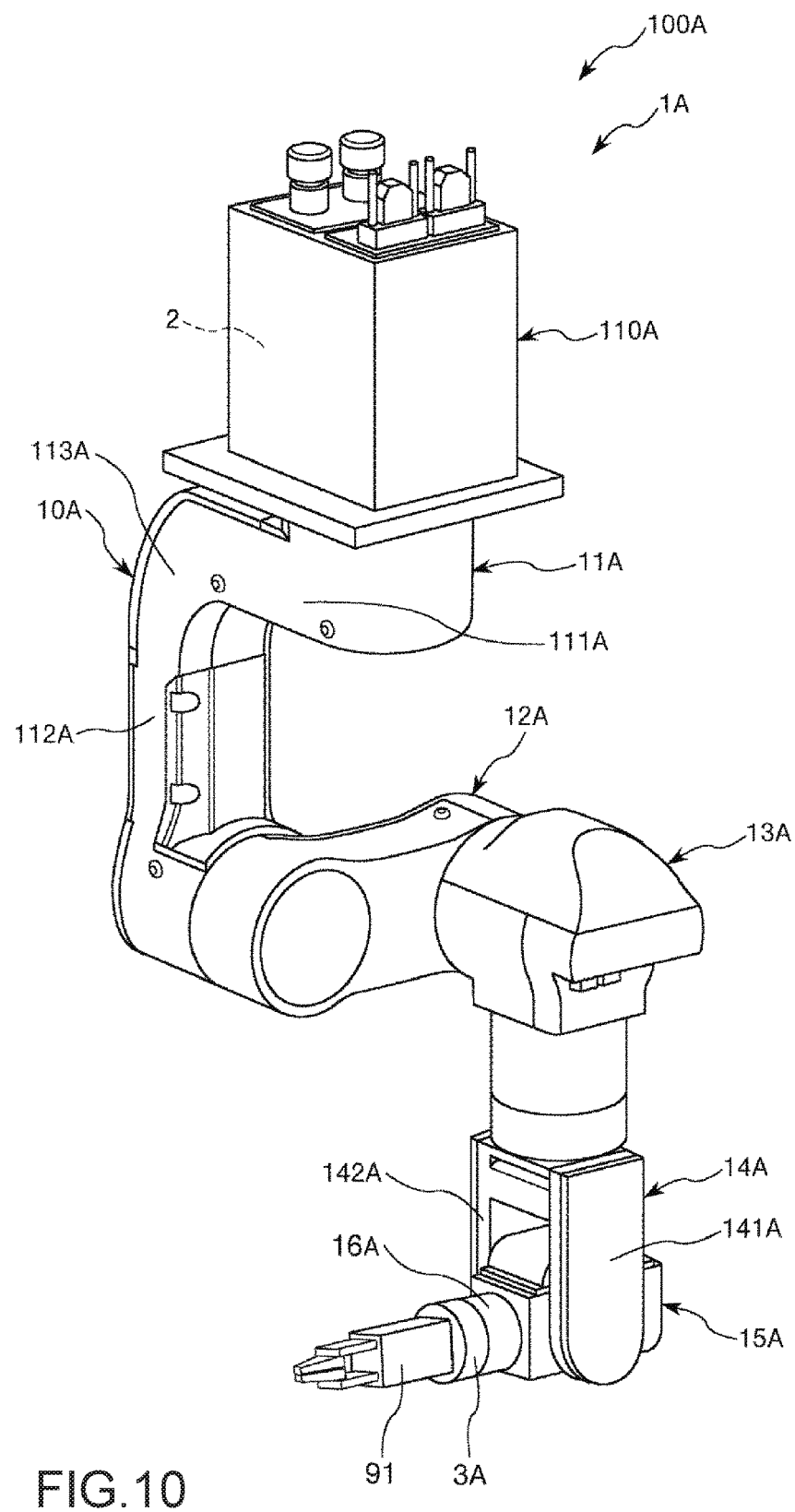
FIG. 10 is a perspective view showing a robot according to a second embodiment of the invention.
Figure 11:
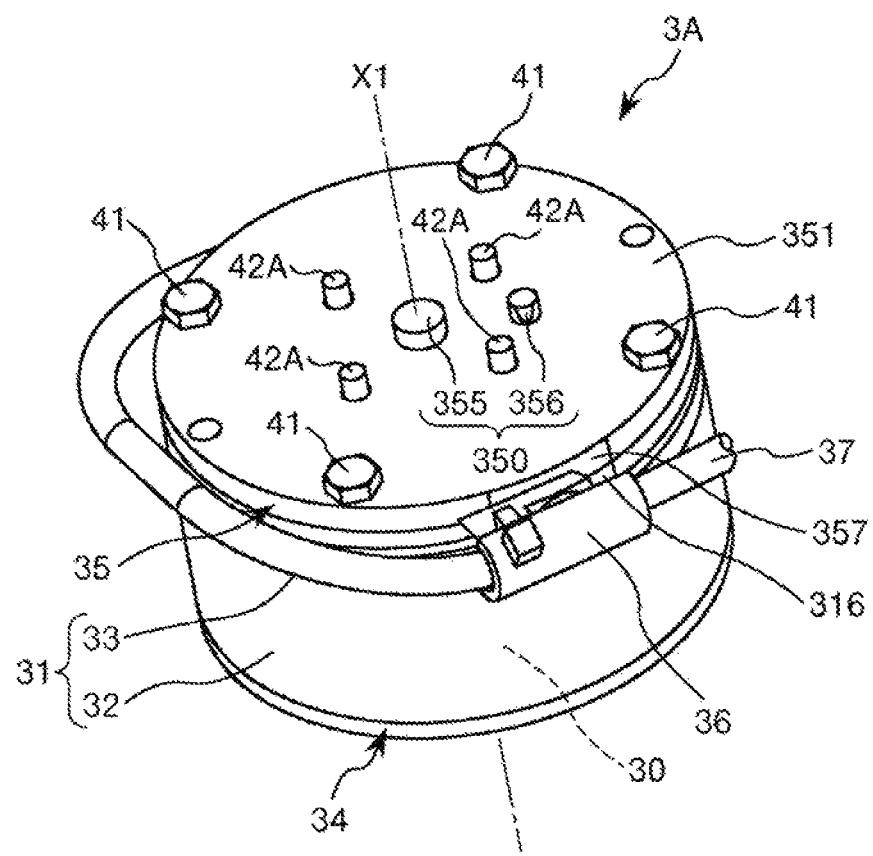
FIG. 11 is a perspective view of a force sensor unit shown in FIG. 10 as seen from an attachment member provided on a robot arm side.
Figure 12:
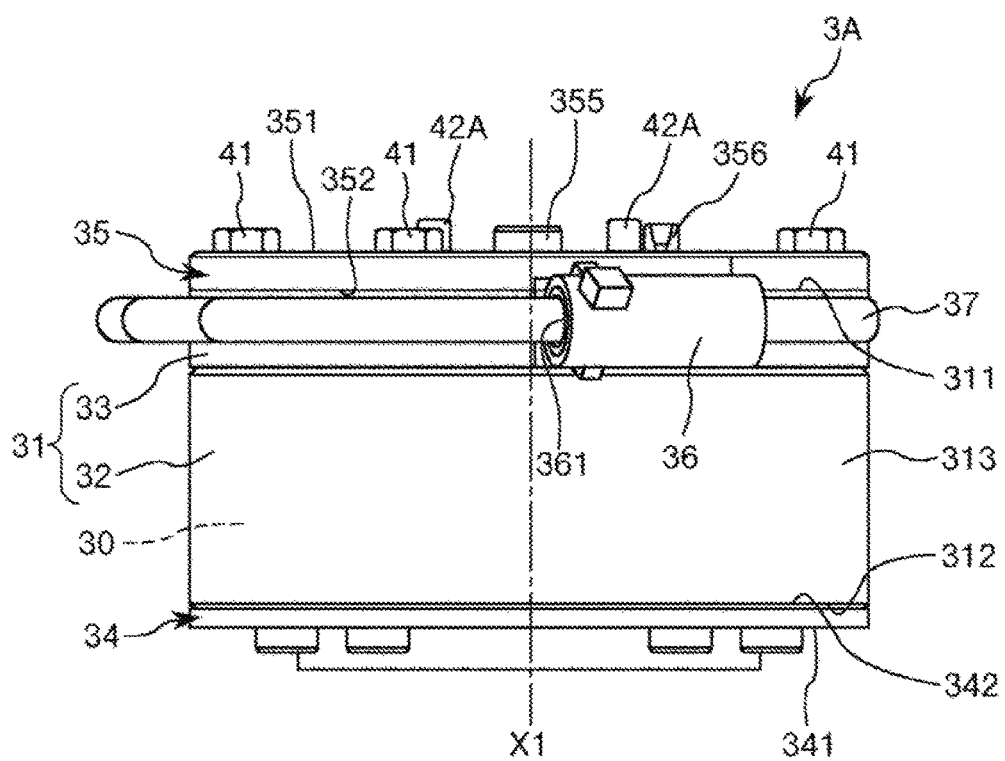
FIG. 12 is a side view of the force sensor unit shown in FIG. 10.

FIG. 10 is a perspective view showing a robot according to the second embodiment of the invention. FIG. 11 is a perspective view of a force sensor unit shown in FIG. 10 as seen from an attachment member provided on a robot arm side. FIG. 12 is a side view of the force sensor unit shown in FIG. 10.

As below, the second embodiment will be explained and the explanation will be made with a focus on the differences from the above described embodiment and the explanation of the same items will be omitted.

1. Robot System

A robot system 100A shown in FIG. 10 has a robot 1A as an example of the robot according to the invention and a control apparatus 2 that controls operation of the robot 1A.
Robot The robot 1A is the so-called six-axis vertical articulated robot and has a base 110A, a robot arm 10A (manipulator), and a force sensor unit 3A.
Robot Arm The robot arm 10A has a first arm 11A (arm), a second arm 12A (arm), a third arm 13A (arm), a fourth arm 14A (arm), a fifth arm 15A (arm), and a sixth arm 16A (arm).

The first arm 11A has a bent shape and the proximal end thereof is connected to the base 110A. The first arm 11A has a first part 111A provided on the base 110A and extending in the horizontal directions, a second part 112A provided on the second arm 12A and extending in the vertical directions, and a third part 113A located between the first part 111A and the second part 112A and extending in a direction inclined with respect to the horizontal directions and the vertical directions. Note that the first part 111A, the second part 112A, and the third part 113A are integrally formed.

The second arm 12A has a longitudinal shape and is connected to the distal end part of the first arm 11A.

The third arm 13A has a longitudinal shape and is connected to the opposite end to the end of the second arm 12A to which the first arm 11A is connected.

The fourth arm 14A is connected to the opposite end to the end of the third arm 13A to which the second arm 12A is connected. The fourth arm 14A has a pair of supporting parts 141A, 142A opposed to each other. The supporting parts 141A, 142A are used for connection to the fifth arm 15A.

The fifth arm 15A is located between the supporting parts 141A, 142A and attached to the supporting parts 141A, 142A to be connected to the fourth arm 14A.

The sixth arm 16A has a circular plate shape in a plan view, and is connected to the distal end part of the fifth arm 15A. Further, a force sensor unit 3A is detachably attached to the distal end part (distal end surface) of the sixth arm 16A. A hand 91 is detachably attached to the opposite end to the end of the force sensor unit 3A to which the sixth arm 16A is connected.

According to the robot 1A having the above described configuration, the entire shape may be made smaller than that of the six-axis vertical articulated robot used in related art while the weight of the object that can be grasped by the hand 91 is maintained.

2. Force Sensor Unit

The force sensor unit 3A shown in FIGS. 11 and 12 has the same configuration except that smaller male screws 42A than the male screws 42 of the above described force sensor unit 3 are used. The type of the male screws 42A for screwing in the robot arm 10A may be changed according to the type of the robot or the like for use.

According to the second embodiment, the same advantages as the advantages in the first embodiment may be exerted.

Third Embodiment

Figure 13:
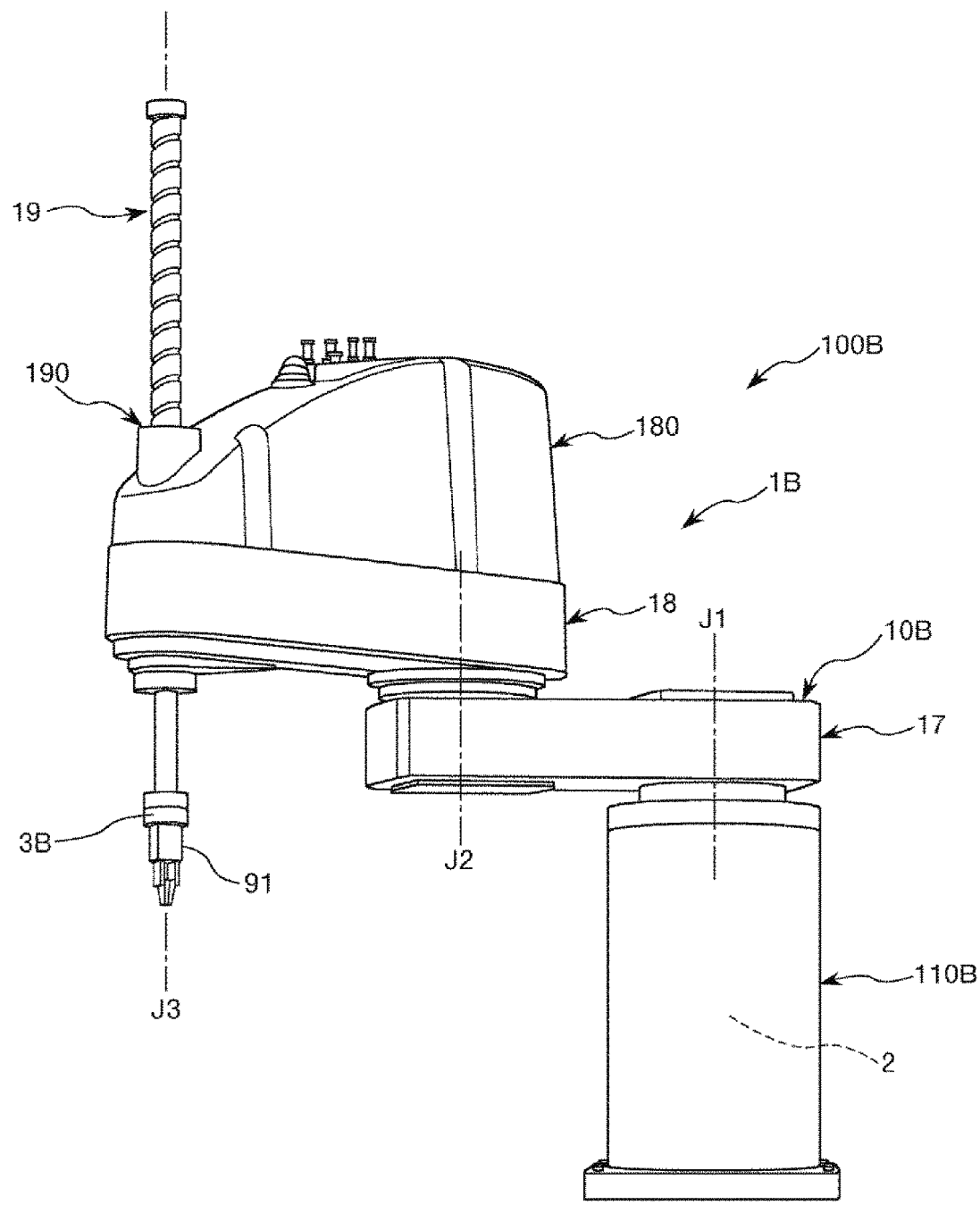
FIG. 13 is a perspective view showing a robot according to a third embodiment of the invention.
Figure 14:
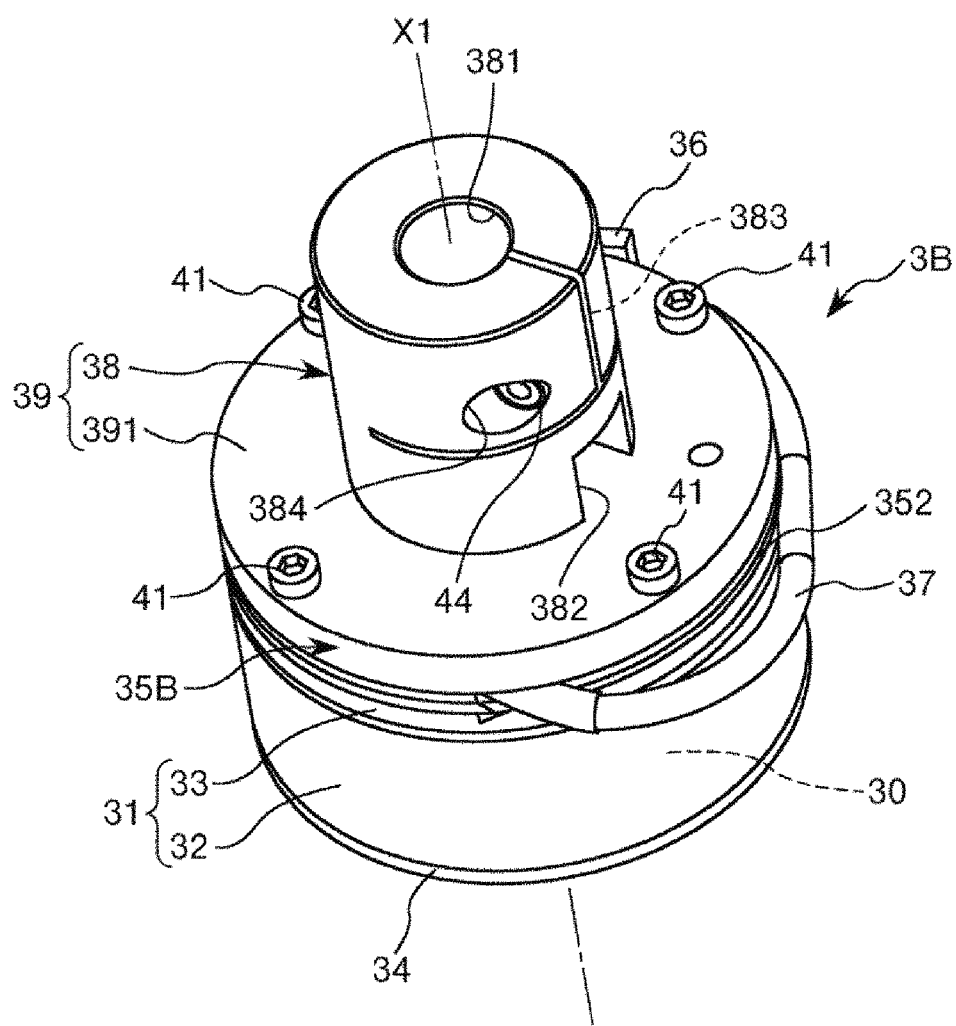
FIG. 14 is a perspective view of a force sensor unit shown in FIG. 13 as seen from an attachment member provided on a robot arm side.
Figure 15:
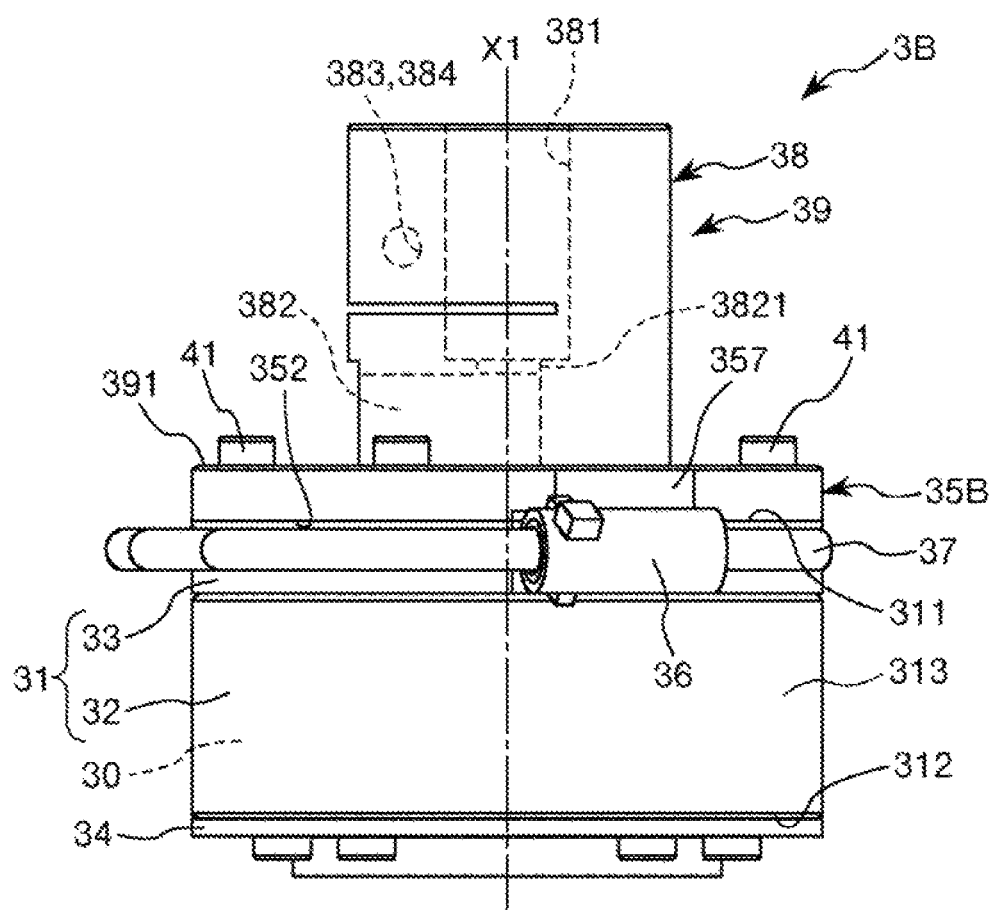
FIG. 15 is a side view of the force sensor unit shown in FIG. 13.
Figure 16:
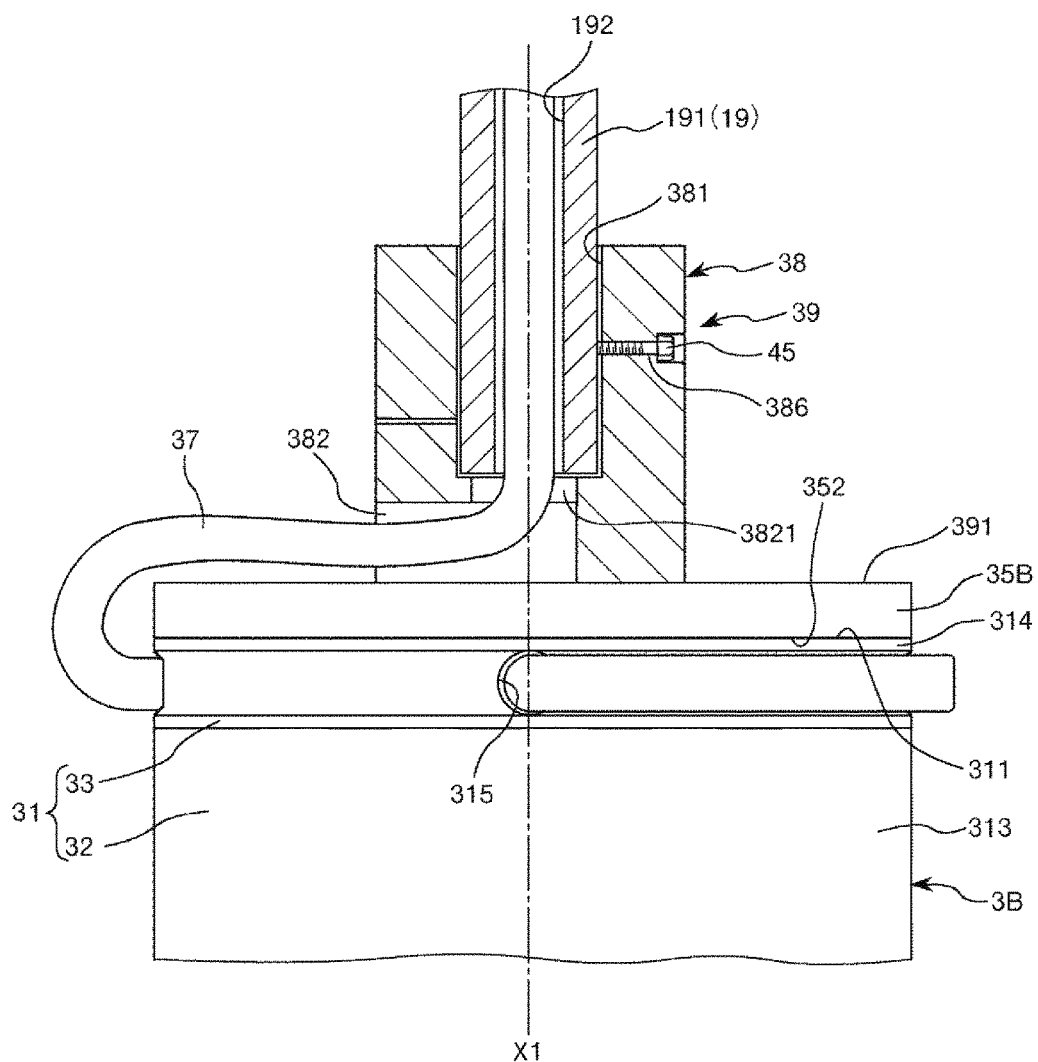
FIG. 16 is a diagram for explanation of an attachment method of a wiring cable.
Figure 17:
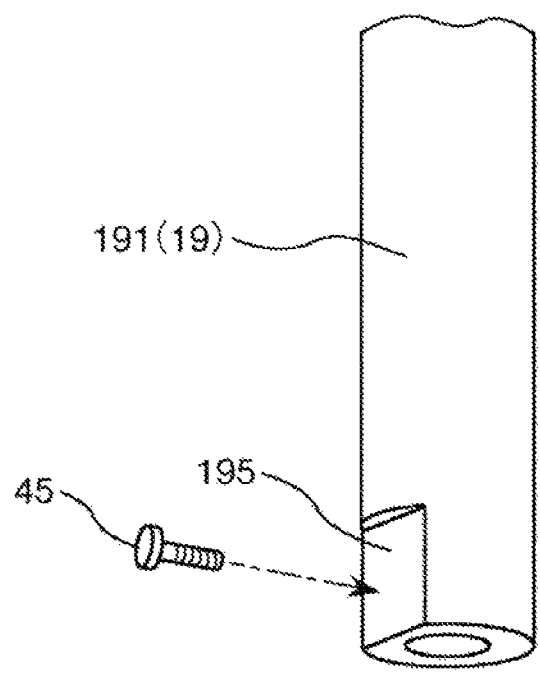
FIG. 17 shows a tip end portion of a spline shaft of the robot shown in FIG. 13.

FIG. 13 is a perspective view showing a robot according to the third embodiment of the invention. FIG. 14 is a perspective view of a force sensor unit shown in FIG. 13 as seen from an attachment member provided on a robot arm side. FIG. 15 is a side view of the force sensor unit shown in FIG. 13. FIG. 16 is a diagram for explanation of an attachment method of a wiring cable. FIG. 17 shows a tip end portion of a spline shaft of the robot shown in FIG. 13.

As below, the third embodiment will be explained and the explanation will be made with a focus on the differences from the above described embodiments and the explanation of the same items will be omitted.

1. Robot System

A robot system 100B shown in FIG. 13 includes a robot 1B as an example of the robot according to the invention and a control apparatus 2 that controls operation of the robot 1B.
Robot The robot 1B is the so-called horizontal articulated robot (scalar robot).

As shown in FIG. 13, the robot 1B has a base 110B, a robot arm 10B, and a force sensor unit 3B.
Robot Arm The robot arm 10B has a first arm 17, a second arm 18, and a spline shaft 19 (arm) provided on a work head 190.

The first arm 17 has a longitudinal shape extending in the horizontal directions and the proximal end part thereof is connected to the upper end part of the base 110B. The first arm 17 is rotatable about a first rotation axis J1 along the vertical directions with respect to the base 110B.

The second arm 18 has a longitudinal shape extending in the horizontal directions and the proximal end part thereof is connected to the opposite end (distal end) to the end (proximal end) of the first arm 17 connected to the base 110B. The second arm 18 is rotatable about a second rotation axis J2 along the vertical directions with respect to the first arm 17.

The work head 190 is provided in the distal end part of the second arm 18. The work head 190 has a spline shaft 19 inserted through a spline nut and a ball screw nut (both not shown) coaxially provided on the tip end part of the second arm 18. The spline shaft 19 is rotatable with respect to the second arm 18 about an axis J3 thereof (a center axis of the spline shaft 19 in the longitudinal direction) and movable in the upward and downward directions (can rise and fall).

Note that, within a cover member 180 provided on the second arm 18, a rotation motor and an elevation motor (not shown) are provided. The drive power of the rotation motor is transmitted to the spline nut by a drive power transmission mechanism (not shown) and, when the spline nut rotates forward and backward, the spline shaft 19 rotates forward and backward about the axis J3 along the vertical directions. On the other hand, the drive power of the elevation motor is transmitted to the ball screw nut by a drive power transmission mechanism (not shown) and, when the ball screw nut rotates forward and backward, the spline shaft 19 moves upward and downward.

The force sensor unit 3B is detachably attached to the distal end part (lower end part) of the spline shaft 19. A hand 91 is detachably attached to the opposite end to the end of the force sensor unit 3B to which the spline shaft 19 is connected.

2. Force Sensor Unit

As shown in FIGS. 14 and 15, the force sensor unit 3B includes an attachment member 35B having a first attachment portion 39. The first attachment portion 39 has a first portion 391 (upper surface) and a second portion 38 projecting from the first portion 391.

The first portion 391 has the same configuration as that of the attachment member 35 in the first embodiment except that the positioning portion 350 in the first embodiment is not provided. That is, the first attachment portion 39 has the first portion 391 having the same configuration as that of the attachment member 35 in the first embodiment and the second portion 38.

The second portion 38 is a convex portion protruding upward from the center part of the first portion 391. As shown in FIGS. 15 and 16, the second portion 38 has a first hole 381 opening in the upper surface (the opposite surface to the first portion 391) and formed along the center line X1 and a second hole 382 opening in the outer surface of the second portion 38 and formed along an axis orthogonal to the center line X1. These first hole 381 and second hole 382 communicate via a communication hole 3821. A part of the wiring cable 37 is inserted through the first hole 381, the second hole 382, and the communication hole 3821. Further, the lower end portion of the spline shaft 19 is inserted through the first hole 381.

As shown in FIGS. 14 and 15, a through hole 384 and a female screw 383 corresponding to the hole are formed in the second portion 38. A male screw 44 (bolt) is screwed into the female screw 383 via the through hole 384, and thereby, the spline shaft 19 inserted through the first hole 381 is fixed to the second portion 38 by clamping.

As shown in FIG. 17, the spline shaft 19 is cut out in the so-called D-cut. Further, a through hole 386 formed along a direction orthogonal to the center line X1 is formed on the side of the second portion 38. Thereby, as shown in FIG. 16, a bolt 45 is inserted through the through hole 386, the bolt 45 is pressed against the D-cut surface 195 of the spline shaft 19, and the attachment member 35B may be positioned with respect to the spline shaft 19. That is, the through hole 386 functions as a positioning portion provided in the first attachment portion 39 for positioning with respect to the robot arm 10B.

In the force sensor unit 3B having the above described configuration, as shown in FIG. 16, the wiring cable 37 is routed from inside the casing 31 to the outside of the casing 31 through the through hole 315 and routed to the side portion 313 of the casing 31. Further, the wiring cable 37 passes through the second hole 382 and the communication hole 3821 and is inserted through a through hole 192 provided in the first hole 381 and formed along the longitudinal direction of the spline shaft 19. The wiring cable 37 passes through the through hole 192 and is electrically connected to the control apparatus 2 via wiring (not shown).

In the above described force sensor unit 3B, the first attachment portion 39 has the first portion 391 and the second portion 38 projected from the first portion 391. Further, in the second portion 38, an insertion portion having the first hole 381, the second hole 382, and the communication hole 3821 as holes through which the part of the wiring cable 37 can be inserted is formed. Furthermore, the spline shaft 19 (a part of the robot arm 10B) can be inserted through the first hole 381. Thereby, the position of the part of the wiring cable 37 may be restricted by the second portion 38, and displacement of the wiring cable 37 may be reduced. Accordingly, the influence on the measurement (detection) of the force sensor 30 by the displacement of the wiring cable 37 may be further reduced. Especially, the configuration is effective when applied to a horizontal articulated robot having the spline shaft 19 with the hole 191 formed therein like the robot 1B of the embodiment.

According to the third embodiment, the same advantages as the advantages in the first embodiment may be exerted.

As above, the force sensor unit and the robot according to the invention are explained with reference to the illustrated embodiments, however, the invention is not limited to those. For example, the configurations of the respective parts of the above described embodiments may be replaced by arbitrary configurations having the same functions, and other arbitrary configurations may be added thereto.

The entire disclosure of Japanese Patent Application No. 2016-122748, filed Jun. 21, 2016 is expressly incorporated by reference herein.

What is claimed is:

1. A force sensor unit comprising: a force sensor; a casing having one end portion, another end portion, and a side portion located between the one end portion and the other end portion and housing the force sensor within a space surrounded by the one end portion, the other end portion, and the side portion; an attachment member having a first attachment portion that can be attached to a robot arm of a robot, and a second attachment portion detachably attached to the one end portion of the casing in a position different from that of the first attachment portion; a wiring cable connected to the force sensor and routed from inside the casing to outside of the casing, and a positioning portion on the first attachment portion and attached to the attachment member, the positing portion being configured to position the attachment member with respect to the robot arm, wherein a part of the wiring cable is provided along a circumferential direction of the side portion to reduce force sensor accuracy degradation by deformation or displacement of the wiring cable.

2. The force sensor unit according to claim 1, wherein the positioning portion has a first positioning member and a second positioning member having convex shapes projecting from the first attachment portion, the first positioning member is provided in a center part of the first attachment portion, and the second positioning member is provided at an outer side of the first attachment portion than the first positioning member.

3. The force sensor unit according to claim 1, wherein the casing and the attachment member respectively have alignment portions used for determination of a relative position relationship with each other.

4. The force sensor unit according to claim 1, wherein a supporting member having an insertion hole through which the part of the wiring cable is inserted and supporting the part of the wiring cable with respect to the side portion is provided in the side portion.

5. The force sensor unit according to claim 1, wherein a concave portion opening toward outside of the casing is formed in the side portion, and
the part of the wiring cable is provided along the concave portion.

6. The force sensor unit according to claim 1, wherein the part of the wiring cable is provided along the side portion in a range at 90° or more in the circumferential direction of the side portion.

7. The force sensor unit according to claim 1, wherein the first attachment portion has a first portion and a second portion projecting from the first portion, and
a hole through which the part of the wiring cable can be inserted is formed in the second portion.

\* \* \* \* \*